Patented Dec. 3, 1940

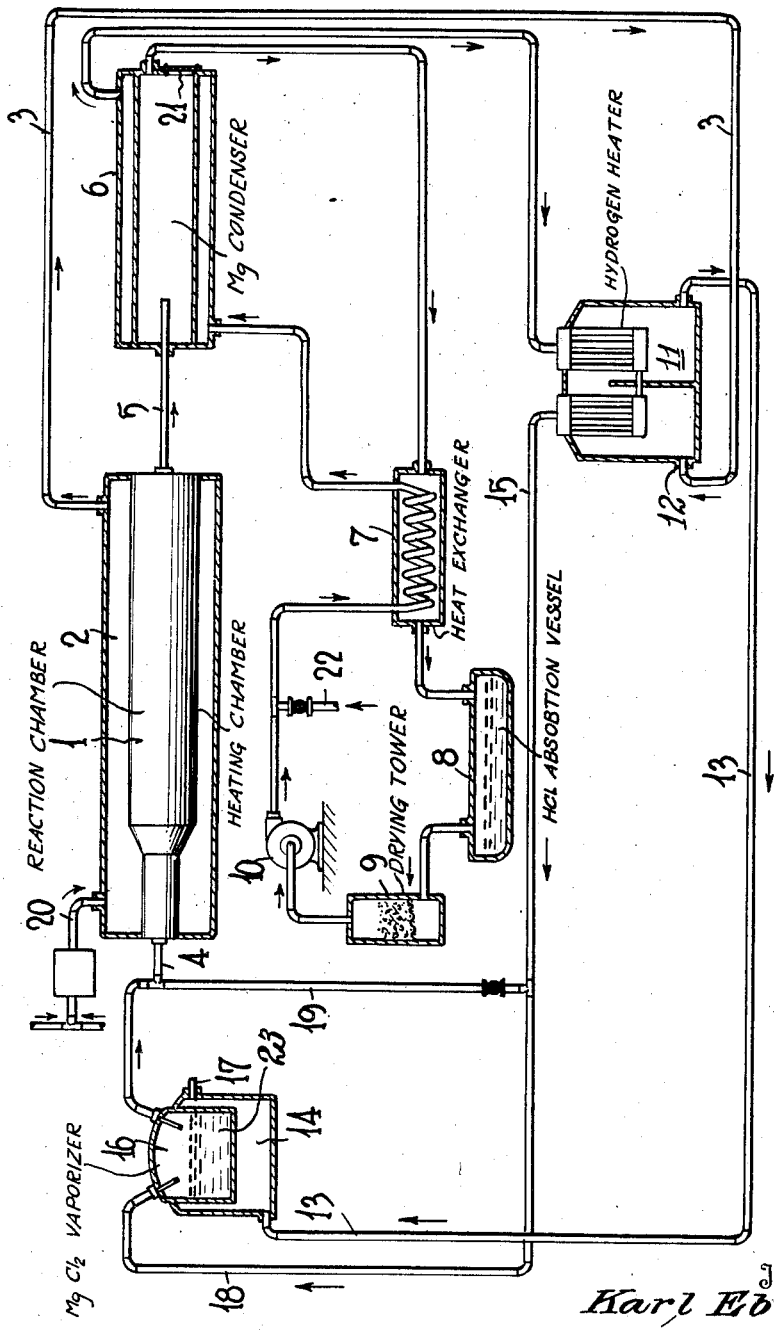

2,224,041

UNITED STATES PATENT OFFICE 2,224,041

PROCESS FOR THE PRODUCTION OF METALLIC MAGNESIUM

Karl Ebner, Oberursel in Taunus, Germany, assignor to American Lurgi Corporation, New York, N. Y., a corporation of New York Application February 3, 1939, Serial No. 254,509
In Germany March 30, 1938

6 Claims. (Cl. 75—67)

This invention relates to an improved process for the production of metallic magnesium.

It has already been proposed to produce metallic magnesium by the treatment of anhydrous magnesium chloride with hydrogen at high temperatures of somewhat above 1200° C. In accordance with this proposal, fused magnesium chloride is atomized by spraying it into a reducing chamber, into which a current of hydrogen introduces the heat required for the evaporation of the magnesium chloride and the reduction thereof. The vaporous products of the reduction, namely, magnesium vapor and hydrogen chloride, and also excess hydrogen, which flow out of the reducing chamber, are then cooled first to condense the magnesium; and then, if desired, the remaining vapors may be cooled further to condense the hydrogen chloride also. The cooling is preferably carried out with recovery of the heat, which may be utilized in the process itself, for example for heating the hydrogen required for the reduction, or for other purposes.

In such a process very large amounts of heat must be supplied to the reducing chamber. As the hydrogen acts both as a heating medium as well as the reducing agent, the excess of hydrogen employed is very great, and the partial pressure of the magnesium vapor in the reaction gases is very low. The partial pressure of the magnesium vapor corresponds approximately to an absolute pressure of 17 mm. of mercury, while the partial pressure of the hydrogen chloride produced by the reaction is equal to about 30 mm. of mercury. In consequence of this a very large and expensive cooling apparatus for the separation of the magnesium and also a large absorption apparatus for the recovery of the hydrogen chloride are required. The absorption apparatus must also be run relatively cold in order that the hydrogen chloride may be removed to a sufficient extent from the hydrogen which is returned to the reduction process.

The object of the present invention is an improvement in this known process. In accordance with the present invention, magnesium chloride which has been previously vaporized is introduced into the actual reaction chamber. The conversion of the magnesium compound employed for the reaction into the vapor state is therefore effected outside of the reaction chamber. For example, an externally heated gas-tight vessel is employed for the evaporation. As, however, magnesium chloride vaporizes only at about 1420° C., the evaporation is advantageously carried out, according to the invention, by conducting over the evaporation surface of the magnesium chloride melt either all of the hydrogen required for the subsequent reduction, or at least a part thereof. On evaporation, the magnesium chloride vapor then mixes intimately with the current of hydrogen and its partial pressure is correspondingly lowered. It is possible, therefore, to evaporate the magnesium chloride at a temperature as low at 1000° C., and for this purpose use may be made of the outgoing heat recovered from the reduction process, so that special additional consumption of heat is not required.

In carrying out the process of the present invention it is only necessary to supply the reaction heat to the reaction chamber so that a substantially smaller, and preferably recycled, current of hydrogen is sufficient. The saving of heat in the reaction zone amounts to about 30%. At the same time, a higher partial pressure of magnesium vapor which is equal to about 30 mm. of mercury is obtained in the reaction gases and the partial pressure of the hydrogen chloride in such gases is correspondingly raised to about 55 mm. of mercury.

The partial pressure of the magnesium vapor and of the hydrogen chloride may be raised still further and the consumption of hydrogen per unit of magnesium produced may also be reduced by supplying heat indirecitly to the reaction chamber. For example, the necessary hydrogen may be heated with outgoing heat from the process and passed through the externally heated magnesium chloride vaporizer. The mixture of hydrogen and magnesium chloride vapor then flows out of the latter at approximately the reaction temperature into the externally heated reduction chamber, from which the gaseous products of the reduction are passed into the magnesium vapor condenser and the hydrogen chloride absorber with suitable heat exchange. The hydrogen, freed from undesirable constituents, can then again and again travel over the same path, the required quantities being added to replace that consumed. The combustion gases escaping from the heating chamber of the reaction chamber may conveniently be used, in this process, for heating the magnesium chloride vaporizer and for heating up the hydrogen to the reaction temperature.

In order that the invention be understood more clearly reference is made to the accompanying drawing, which illustrates diagrammatically and by way of example one embodiment of apparatus suitable for carrying the process into practical effect.

In said drawing, 1 is a reaction chamber which is surrounded by the heating chamber 2. The heating may be effected with any desired fuels, for example, a mixture of producer gas and preheated air, so that a combustion temperature of about 1800° C. is obtained. The heating gases are, for example, introduced into the heating chamber through pipe 20. The combustion gases flow out of the heating chamber through the pipe 3 at a temperature of about 1500° C. A mixture of hydrogen and magnesium chloride vapor is introduced into the reaction chamber by means of the pipe 4. On completion of the reaction the resulting gaseous mixture containing hydrogen, magnesium vapor and hydrogen chloride vapor is passed through the pipe 5, for example, into a cooler 6 wherein the metallic magnesium is precipitated by suitable cooling and is removed at 21. The gas is further cooled in a heat exchanger 7, and thereupon passed into the absorption apparatus 8 containing an aqueous medium in which the hydrogen chloride is separated in the form of hydrochloric acid. 9 is a drying apparatus for removing the water vapor absorbed by the gases. The dried hydrogen is then passed by the blower 10 through the heat exchanger 7 and the outside of the cooler 6, in both of which it indirectly takes up the heat of the gas mixture flowing out of the reaction chamber. The preheated hydrogen then passes into the heat exchanger 11, in which it is indirectly heated to a higher temperature by the gases passing out of the heating chamber. The gases leaving the heating chamber are introduced, for example, at 12 into the heat exchanger and are then withdrawn from the latter and are introduced into vessel 14, which serves to melt and evaporate the magnesium chloride through the conduit 13 to serve as a heating medium for such vessel. The gases then escape from vessel 14 at 17. In the vessel 23 the magnesium chloride is vaporized while either the whole of the preheated hydrogen, or only a portion thereof, is passed through the pipes 15 and 18 over the evaporation surface 16 of the magnesium chloride. For example, a part of the hydrogen may be passed through the pipe 18 into the vessel 23 and the remainder may be passed through the pipe 19 into the reaction chamber through the pipe 4, where it reunites with the portion of the hydrogen which has passed through the vessel 23 and has taken up the desired amount of magnesium chloride vapor, or all of the preheated hydrogen may be passed through pipes 15 and 18 over the evaporation surface 16 of the magnesium chloride. Conduit 22 serves to introduce the necessary amount of hydrogen into the system to replace that which is used in the reduction of the magnesium chloride.

While I have described my invention with reference to one embodiment of the invention, I wish it to be understood that I do not intend to limit myself thereby except within the scope of the appended claims.

I claim:

1. In a process for the preparation of elemental magnesim by heating magnesium chloride in the presence of hydrogen the steps comprising vaporizing magnesium chloride in a heated vessel in a hydrogen atmosphere and then introducing the resulting hydrogen magnesium chloride vapor mixture into a reducing chamber while indirectly heating such gaseous mixture to the temperature necessary for reaction.

2. In a process for the preparation of elemental magnesium by heating magnesium chloride in the presence of hydrogen the steps comprising vaporizing magnesium chloride in a heated chamber in a hydrogen atmosphere, then introducing the resulting hydrogen magnesium chloride vapor into a reducing chamber while indirectly heating such gaseous mixture in such chamber to a temperature of at least substantially 1200° C.

3. In a process for the preparation of elemental magnesium by heating magnesium chloride in the presence of hydrogen the steps comprising vaporizing magnesium chloride under a stream of hydrogen in an externally heated chamber and then introducing the resulting hydrogen magnesium chloride vapor mixture into an externally heated reduction chamber while heating such gaseous mixture to the temperature necessary for the reaction and then condensing the ensuing magnesium vapors at a point outside of the reducing chamber.

4. In a process for the preparation of elemental magnesium by heating magnesium chloride in the presence of hydrogen the steps comprising vaporizing magnesium chloride under a stream of hydrogen in an externally heated chamber, then introducing the resulting hydrogen magnesium chloride vapor mixture into a reduction chamber heated externally with hot combustion gases while heating such gaseous mixture to the temperature necessary for the reaction, and heating the hydrogen and evaporating the magnesium chloride employed in the process with the residuary heat in the combustion gases at a point outside of the reduction chamber.

5. In a process for the preparation of elemental magnesium by heating magnesium chloride in the presence of hydrogen the steps comprising vaporizing magnesium chloride under a stream of hydrogen in an externally heated chamber, then introducing the resulting hydrogen-magnesium chloride vapor mixture into a reduction chamber heated externally with hot combustion gases while heating such gaseous mixture to the temperature necessary for the reaction and consecutively heating the hydrogen and evaporating the magnesium chloride employed in the process with the residuary heat in the combustion gases at a point outside of the reduction chamber.

6. In a process for the preparation of elemental magnesium by heating magnesium chloride in the presence of hydrogen, the steps comprising heating a stream of hydrogen, vaporizing magnesium chloride under at least a portion of said stream of preheated hydrogen in an externally heated chamber, then introducing the resulting hydrogen-magnesium chloride vapor mixture into a reduction chamber heated externally while heating such gaseous mixture to the temperatures necessary for the reduction and then condensing the ensuing magnesium vapors at a point outside of the reducing chamber.

KARL EBNER.